(12) United States Patent
Qin et al.

(10) Patent No.: US 10,409,823 B2
(45) Date of Patent: Sep. 10, 2019

(54) IDENTIFYING CONTENT FOR USERS ON ONLINE SOCIAL NETWORKS

(71) Applicant: Facebook, Inc., Menlo Park, CA (US)

(72) Inventors: Yang Qin, Menlo Park, CA (US);
Zhong Zhang, Fremont, CA (US);
Sergiu-Cosmin Ferentz, Menlo Park, CA (US); Dan Ionut Fechete, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 593 days.

(21) Appl. No.: 14/983,321

(22) Filed: Dec. 29, 2015

(65) Prior Publication Data

US 2017/0185601 A1    Jun. 29, 2017

(51) Int. Cl.
*G06F 16/2457* (2019.01)
*G06F 16/9535* (2019.01)
*G06Q 50/00* (2012.01)

(52) U.S. Cl.
CPC .... *G06F 16/24578* (2019.01); *G06F 16/9535* (2019.01); *G06Q 50/01* (2013.01)

(58) Field of Classification Search
CPC ..................................................... G06Q 50/01
See application file for complete search history.

(56) References Cited

U.S. PATENT DOCUMENTS

| | | | | |
|---|---|---|---|---|
| 8,312,056 B1 * | 11/2012 | Peng | ....................... | G06Q 50/01 |
| | | | | 705/319 |
| 8,838,589 B1 * | 9/2014 | Tam | .................. | G06F 17/30702 |
| | | | | 707/732 |
| 2010/0049534 A1 * | 2/2010 | Whitnah | ................ | G06Q 30/02 |
| | | | | 705/319 |
| 2010/0161369 A1 * | 6/2010 | Farrell | ................... | G06Q 10/10 |
| | | | | 705/319 |
| 2012/0166432 A1 * | 6/2012 | Tseng | ................ | G06F 17/30867 |
| | | | | 707/728 |
| 2012/0221544 A1 * | 8/2012 | Hu | ......................... | G06Q 30/02 |
| | | | | 707/708 |
| 2012/0311030 A1 * | 12/2012 | Lin | ......................... | G06F 15/16 |
| | | | | 709/204 |
| 2013/0018896 A1 * | 1/2013 | Fleischman | ............ | G06Q 50/01 |
| | | | | 707/748 |
| 2013/0018968 A1 * | 1/2013 | Pennacchiotti | ........ | G06Q 10/10 |
| | | | | 709/206 |

(Continued)

*Primary Examiner* — William Spieler

(74) *Attorney, Agent, or Firm* — Baker Botts L.L.P.

(57) ABSTRACT

In one embodiment, a method includes, in an online social network, accessing one or more first content objects associated with a user in the online social network and a second content object, determining topics and corresponding first weights of the topics for the first content objects using a topic extraction algorithm, where each first weight indicates a strength of an association between the corresponding topic and the first content object(s), determining one or more second weights of the topics for the second content object, where each second weight indicates a strength of an association between the corresponding topic and the second content object, and calculating a similarity score for the second content object based on a comparison of, for each topic, the first weight to the second weight, where the similarity score is to be used in a determination regarding presentation of the second content object to the user.

15 Claims, 10 Drawing Sheets

(56) References Cited

U.S. PATENT DOCUMENTS

| | | | | |
|---|---|---|---|---|
| 2013/0124437 | A1* | 5/2013 | Pennacchiotti | G06Q 30/0255 |
| | | | | 706/12 |
| 2013/0159110 | A1* | 6/2013 | Rajaram | G06Q 30/02 |
| | | | | 705/14.66 |
| 2014/0012927 | A1* | 1/2014 | Gertzfield | G06Q 50/01 |
| | | | | 709/206 |
| 2014/0274354 | A1* | 9/2014 | George | G06Q 30/0631 |
| | | | | 463/29 |
| 2014/0338002 | A1* | 11/2014 | Kau | G06F 17/30424 |
| | | | | 726/28 |
| 2015/0286709 | A1* | 10/2015 | Sathish | G06N 7/005 |
| | | | | 706/52 |
| 2016/0034514 | A1* | 2/2016 | Singhal | G06F 17/30867 |
| | | | | 707/706 |
| 2016/0140447 | A1* | 5/2016 | Cohen | G06N 5/02 |
| | | | | 706/52 |
| 2016/0188704 | A1* | 6/2016 | Dassa | G06F 16/9535 |
| | | | | 707/750 |
| 2016/0189028 | A1* | 6/2016 | Hu | G06N 5/02 |
| | | | | 706/46 |
| 2017/0039278 | A1* | 2/2017 | Marra | G06Q 50/01 |
| 2017/0161619 | A1* | 6/2017 | Franceschini | G06N 5/022 |
| 2017/0344572 | A1* | 11/2017 | Peterson | G06F 17/30112 |

* cited by examiner

IDENTIFYING CONTENT FOR USERS ON ONLINE SOCIAL NETWORKS

TECHNICAL FIELD

This disclosure generally relates to identifying information of interest to users in online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may determine whether content, such as news, events, messages, or the like, is of interest to a particular user by identifying topics of the content and comparing the topics to topics of other content that is known to be of interest to the user. A "topic model," such as Latent Dirichlet Allocation (LDA) automatically identifies topics of content. The LDA technique can identify "latent topics" that are not explicitly present in the content. A degree of similarity between the topics of content known to have a particular characteristic and topics of other content can be calculated and used to determine whether, and to what degree, the other content also has the characteristic. The other content can then be processed as appropriate for content having the characteristic, e.g., by recommending content that is similar to other content known to be of interest to the user.

For example, content such as news, events, or email messages may be analyzed to identify the content's topics. If the identified topics are sufficiently similar to topics of news, social-network events, or email messages that are known to be of interest to the user, then the content may be recommended to the user as being of potential interest. As another example, if the topics of an email message are sufficiently similar to topics of email messages that the user has previously marked as being unsolicited and of no interest (e.g., spam), then the email message may be discarded without being presented to the user.

For a given item of content, the topic model may produce a topic and a numeric weight that indicates how strongly the content is associated with the topic. As an example, given a first item of content "a good movie," the topic model may produce the topic "entertainment" with weight 0.7. The similarity between two sentences may be determined using a similarity algorithm, e.g., cosine similarity, on the topic score vectors of the two sentences. Thus, for a second item of content "great game," the topic model may produce the topic "entertainment" with weight 0.9. A similarity score for the common topic "entertainment" may then be calculated, e.g., 0.8 (the average of the weights). Alternatively, other types of similarity scores may be used, e.g., a cosine similarity score. The similarity score may then be compared to a threshold value or condition to determine how to present the second sentence to the user. For example, a threshold condition may specify that the second sentence is to be presented to the user if the first item of content is of interest to the user and the similarity score is 0.75 or greater. In this example, the content "great game" may be presented to the user because the similarity score is 0.8. For text content, such as news stories, comparing the topics extracted from two text strings in this way may involve significantly fewer computations than word-for-word comparison of the two content items because of the reduction in the number of words to be compared.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
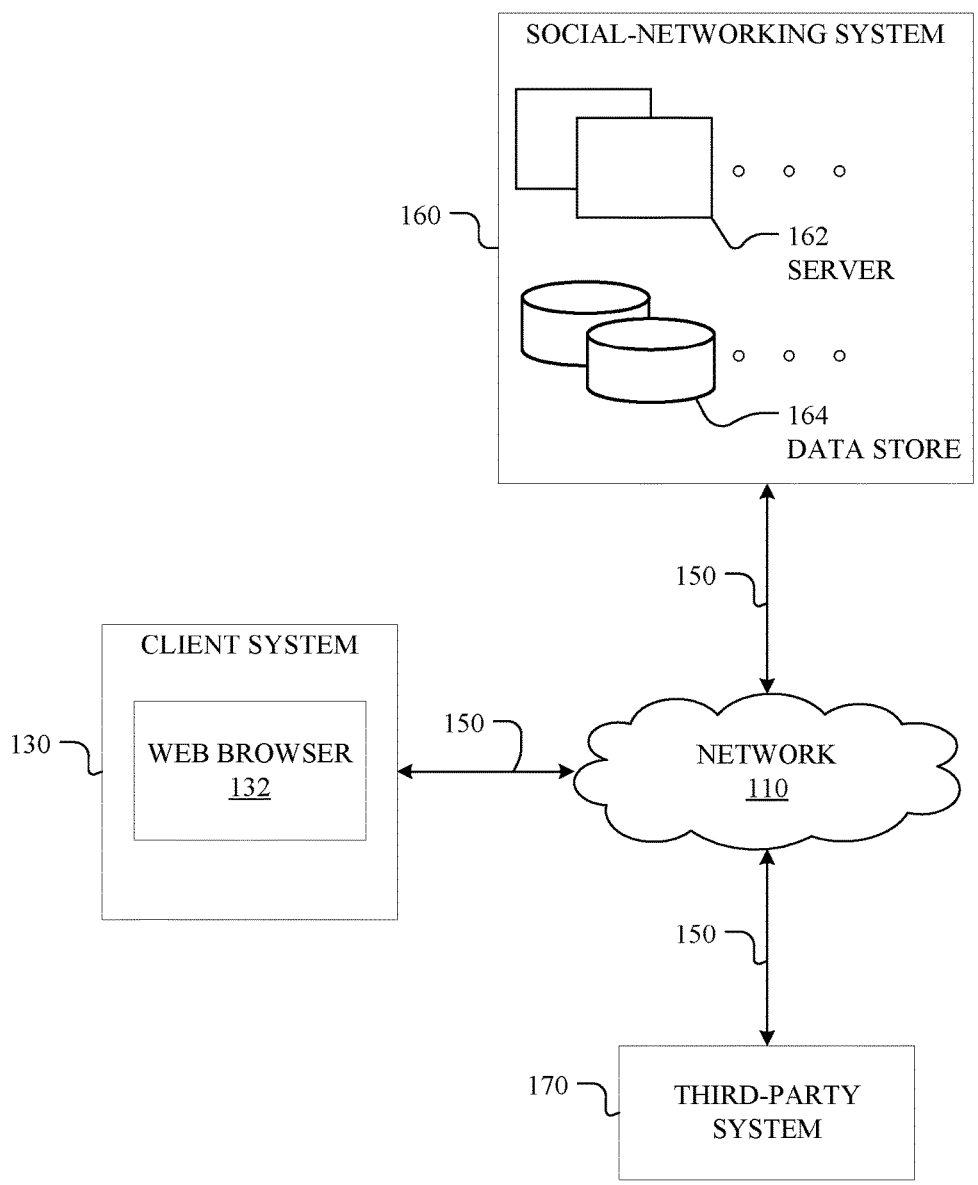
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-andnetwork-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
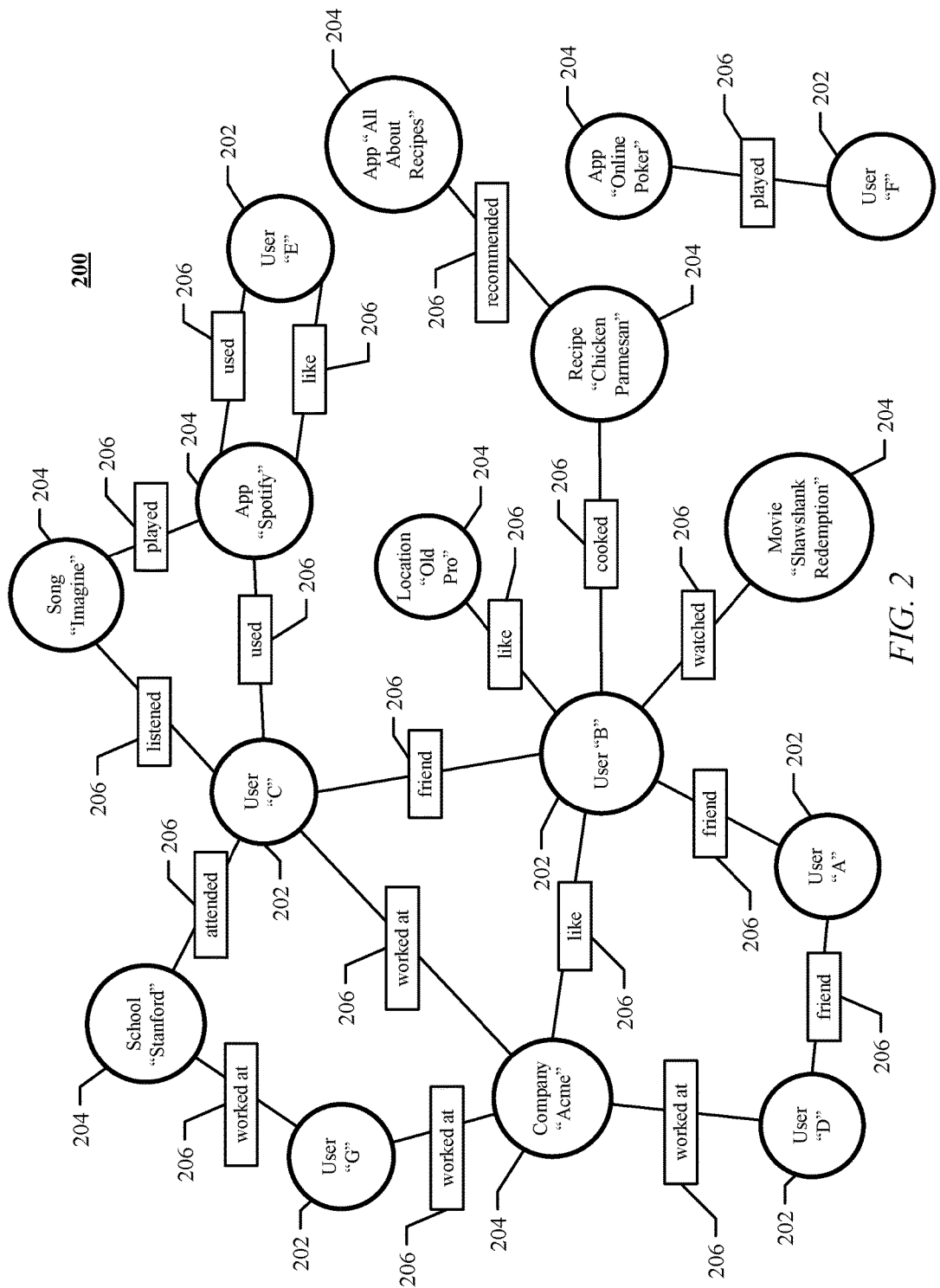
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr.

2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12

Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

LDA for Latent Topics

To identify content of interest to a user, a "degree of similarity" between content having a known degree of interest to a user, e.g., existing news stories or events, and candidate content, e.g., new news stories or events, may be determined by comparing the topics of the existing content to topics of the new content. Topics may be extracted using Latent Dirichlet Allocation (LDA) or other machine-learning techniques, which may also generate weights that indicate how strongly the corresponding topics are associated with the content. The degree of similarity may be used to determine how to process the content in accordance with the user's interests. For example, if a user has expressed interest in or a like for a news story, the topic(s) of the story, e.g., "basketball," may be extracted and compared to topics of other stories to determine whether the other stories are of interest to the user. Thus, if a new story is found to also have the topic "basketball," then the new story is likely to be of interest to the user. The weights associated with the topics may be used to calculate the degree of similarity between the stories being compared. The degree of similarity can be used to determine whether to recommend the new story to the user, or how to rank the new story in a list of stories for the user. As another example, unsolicited "spam" email, may be identified by comparing topics of email that the user has marked as spam to topics of incoming email, and incoming email having a sufficient degree of similarity to the email marked as spam may be classified as spam.

Figure 3:
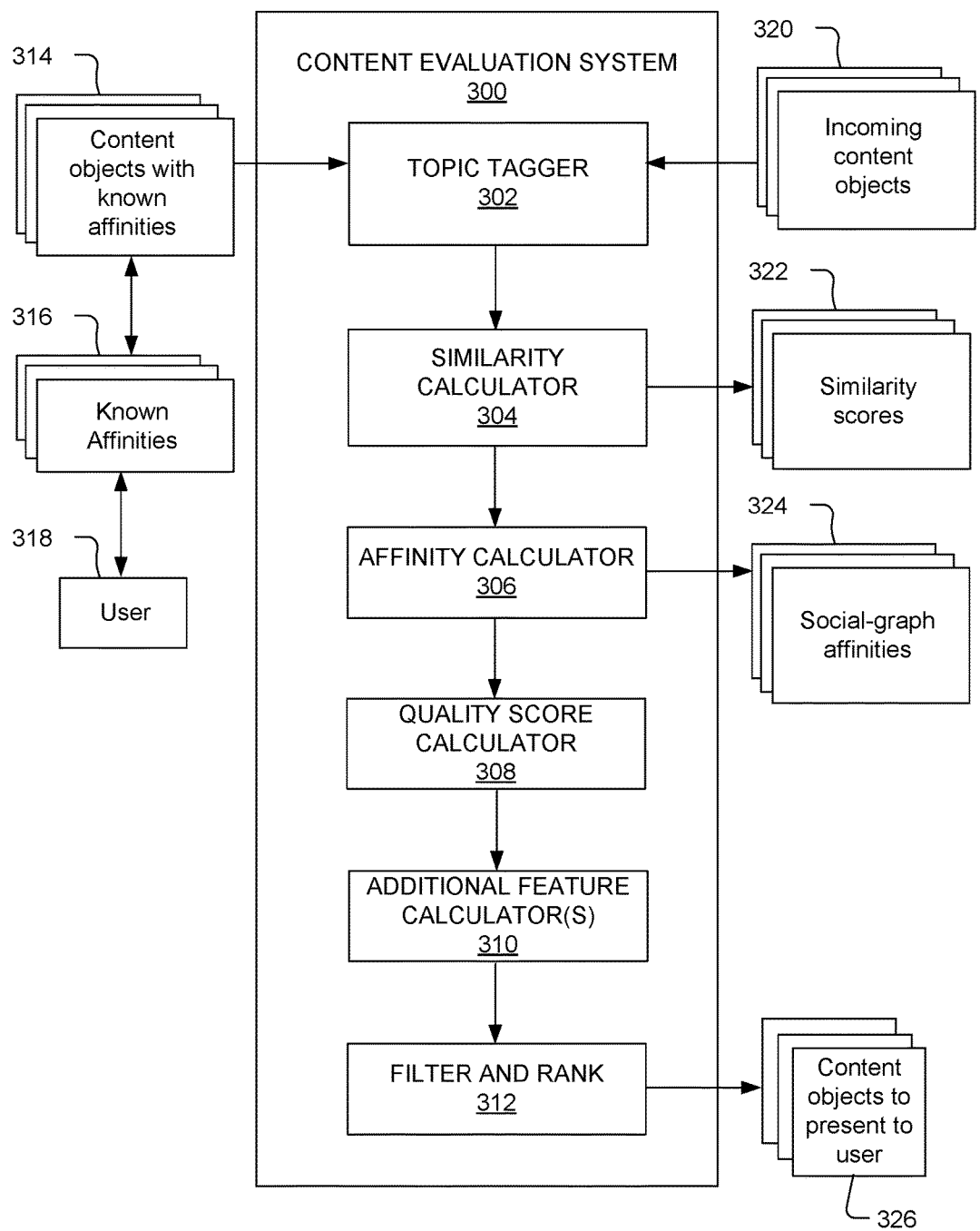
FIG. 3 illustrates an example content evaluation system for identifying similar content.

FIG. 3 illustrates an example content evaluation system 300 for identifying similar content. The content evaluation system 300 receives as input existing content objects 314 and incoming content objects 320. The content objects may be news stories, social-network events, messages, social-network posts or comments, or the like. The existing content objects 314 may be associated with one or more users 318. The association between the existing content objects 314 and a user 318 may be established by existence of an edge between a user node that represents the user 318 and a node that represents or is associated with the existing content object 314. The edge may represent a relationship such as likes, or a "joined" relationship that indicates the user has joined an event (for a content object 314 that represents an event). The edge may represent any other suitable relationship between the user 318 and the existing content object 314, e.g., a "dislike" relationship indicating that the user 318 dislikes the content object 314, a "viewed" relationship indicating that the user 318 has viewed the content object 314, and the like. A social-graph affinity 316 represents the strength of a relationship or level of interest between the user 318 and the existing content object 314. The social-graph affinity 316 may be represented as a number, such as a floating-point value between 0 and 1, where 0 indicates a weak or nonexistent relationship, and 1 indicates a strong relationship, or between −1 and 1, where −1 represents a strong negative relationship, e.g., a strong dislike, between the user 318 and the existing content object 314. As another example, the association between one or more of the existing content objects 314 and a user 318 may be established by a mention of the existing content object 314 in a post, comment, or other text created by the user 318, or, conversely, by a mention of the user 318 in text of the content object 314.

The content evaluation system 300 generates one or more similarity scores 322 that indicate a degree of similarity (e.g., on a scale of 0 to 1) between each incoming content object 320 and one or more existing content objects 314. A similarity score 322 may be calculated between an incoming content object 320 and multiple different existing content objects 314 by calculating similarity scores between the incoming content object 320 and each of the existing content objects 314 and taking the average of those similarity scores. Alternatively, the similarity scores for each existing content object 314 may be retained and stored in a vector of similarity scores for each incoming content object 320. Multiple existing content objects may be compared to a single incoming content object 320 when, for example, a user 318 is associated with a set of existing content objects 314 by the same type of relationship, e.g., by joining several different events in the online social network, by liking several different news stories, or by marking several different email messages as spam.

In particular embodiments, the content evaluation system may optionally produce one or more social-graph affinities 324 of the user 318 for the incoming content objects 320. The social-graph affinities 324 may be based on the similarity scores 322, e.g., there may be one social-graph affinity 324 for each similarity score 322. That is, the social-graph affinities 316 of the existing content objects 314 may influence the affinities 324 determined for the incoming content objects 320. For example, the social-graph affinities 324 may be generated by multiplying the similarity scores 322 by the social-graph affinities 316 of the existing content objects 314. In this way, the user's level of interest in an existing content object 314 may be rep-resented on a scale, e.g., as a value between 0 and 1, or between −1 and 1. For example, if the user 318 has a strong interest in an existing content object 314, then the social-graph affinity 316 between the user and the content object may have a relatively high value, such as 0.9. When the social-graph affinity 324 of the incoming content object 320 is generated, the similarity score 322 that indicates the degree of similarity between the incoming content object 320 and the existing content object 324 may be multiplied by the social-graph affinity 316 of the existing content object 314. This multiplication may scale the similarity score 322 of the incoming content object by the degree of the user's interest in the existing content object 314 to which the incoming content object 320 is compared, to arrive at the social-graph affinity 324 of the of the incoming content object. The social-graph affinity 316 of the existing content object 314 may be negative to indicate that the user 318 is not interested in the existing content object 314, in which case the multiplication of the social-graph affinity 316 by the similarity score 322 results in a negative affinity of the incoming content object, signifying that the incoming content object is not of interest to the user 318. The social-graph affinities 324 may be used to convert similarity scores to negative values when appropriate, e.g., for spam email content objects 314. As described above, negative affinity scores may indicate that the user has no interest in a content object 314, 324, as may be the case for spam email.

The value of the social-graph affinity 316 of the existing content object 314 may thus be set by the social-networking system prior to invocation of the content evaluation system 300, e.g., based on user feedback or user actions, such as liking a content object 314 or marking a content object 314 as spam, to cause similar incoming content objects to be processed in a positive manner (e.g., by being presented to the user or ranked highly in a list of news stories), or in a negative manner (e.g., by being discarded as spam). The degree to which similar incoming content objects 320 are processed in a similar manner may be specified by setting the social-graph affinity value 316 of the existing content object 314 to an appropriate numeric value, e.g., a value near 0 (positive or negative) to indicate a weak affinity in the direction specified by the sign (positive or negative), a value near +1 to indicate a strong affinity in a positive direction, or a value −1 to indicate a strong affinity in a negative direction.

In particular embodiments, the components of the content evaluation system 300 implement the operations described above. A topic tagger 302 generates topics and associated weight values for the existing content objects 314 and the incoming content objects 320. The topic tagger 302 may be trained using training data and topic assignments provided by human trainers. The topic tagger 302 may use a "topic model," such as Latent Dirichlet Allocation (LDA), to automatically identify weighted latent topics of the existing content objects 314 and of the incoming content objects 320. The topic model's algorithm may extract topics from text associated with the content objects, e.g., from event descriptions associated with event content objects. The topics may be latent topics, e.g., not explicitly identified in the content. Each topic may correspond to a cluster of words, and may have an associated label, such as "Topic A", which identifies the topic. The labels may be assigned by the LDA algorithm, and may be values that identify the topic without having any particular meanings related to the cluster of words associated with the topic. Meaningful labels such as "entertainment," "basketball," or the like may be assigned to a topic based on the cluster of words in the topic, either by an algorithm or by a human. As an example, for the content "Michael Jordan did a great job in the game," a latent topic may correspond to the word "basketball", which is not in the text. The LDA algorithm does not necessarily generate the word "basketball" as the topic. Instead, the LDA algorithm may generate a topic that corresponds to the cluster of words "Michael Jordan" and "game" and has a label, such as "Topic 1". To identify a meaningful label, e.g., "basketball", an automated or manual (e.g., human-performed) process may be used to identify a word such as "basketball" based on the meanings of the words in the cluster (e.g., "Michael Jordan" and "game").

When LDA is used, a set of possible topics may be predetermined. If there are 100 topics in total, then the topic tagger 302 generates a vector of 100 weights, each of which is associated with one of the predetermined topics. As an example, for each item of text content, e.g., content object, the result of the topic tagger 302 may be a vector of topics and/or a vector of weights. In the examples described herein, there is a weight for each topic, e.g., weights of 0.1, 0.05, 0.2, or the like, so the output of the topic tagger may be represented as a vector of weight values whose positions in the vector correspond to their associated topics. Although weights are shown as floating-point values between 0 and 1 herein, weights may also be in other ranges, e.g., 1 to 1000, −100 to 100, and so on. Topics that are not present in the content object have a weight of zero in the topic tagger output.

For example, the topic tagger 302 may have been trained to categorize the words good, fantastic, and awesome into Topic A, the words movie, theater, and ticket into Topic B, and the words bad and terrible into Topic C. The topic tagger 302 can be applied to descriptive text to extract topics. For example, for the text "a good movie," the topic tagger 302 may extract Topic A (because the text contains Topic A's word "good") and Topic B (because the text contains Topic B's word "movie"). The weight produced by the topic tagger 302 for each extracted topic may indicate how well the text matches the topic, or may be based on some other metric that indicates a strength or weight of association between the topic and the text. For the example text "a good movie," the resulting vector is <0.1, 0.05, 0>, in which the first value is the score for Topic A ("good"), the second value is the score for Topic B ("movie"), and the third value is the score for Topic C (not present, so the score is 0). The topic-extraction algorithm is language-independent, e.g., can be used with any human language such as English, Spanish, Japanese, and so on. It is contemplated that a topic may have words in one or more human, e.g., one or more of English, Spanish, French, Mandarin, and the like.

In particular embodiments, each topic and associated weight may be passed to a similarity calculator 304, which may calculate similarity scores 322 that represent a degree of similarity between each of the incoming content objects 320 and one or more of the existing content objects 314. Each similarity score 322 may be calculated using cosine similarity on topic weight vectors produced by the topic tagger 302. For example, a first topic score vector V1 may be computed for an incoming content object 320 and compared to an existing topic score vector V0 calculated for one of the existing content objects 314. The degree of similarity between V1 and V0 may be computed as a similarity score 322 using a cosine similarity or other comparison algorithm. In particular embodiments, the similarity score may be used to determine whether to present the associated incoming content objects 320 to the user, e.g., by bypassing the affinity calculator 306 described below and. In other embodiments, the similarity score may be passed to the affinity calculator 306 to calculate social-graph affinities 324 based on the similarity scores 322 and the social-graph affinities of the existing content objects 314 (as described above).

In particular embodiments, the affinity calculator 306 may calculate a social-graph affinity 324 for each incoming content object by multiplying the similarity score 322 of each incoming content object 320 by the social-graph affinity of the existing content object 316 that was compared to the incoming content object 320 by the topic tagger 302. The resulting affinity 324 of the incoming content object may be scaled by the level of interest of the user 318 for the existing content object 314 (e.g., if the social-graph affinity 316 of the existing content object 314 is a fractional value between 0 and 1), may be converted to an indication of no interest (e.g., if the social-graph affinity 316 is 0), or may be converted to a negative level of interest (e.g., if the social-graph affinity 316 is a negative fractional value between −1 and 0).

In particular embodiments, a quality score calculator 308 may calculate a quality score for each incoming content object 320 based on a combination of the affinity score 324 (or the similarity score 322) and one or more other scores generated based on other measures, such as a TF-IDF score. The scores may be combined by, for example, calculating an average or weighted average of the similarity score and other quality scores. More information on quality scores may be found in U.S. patent application Ser. No. 14/938,685, filed 11 Nov. 2015, having, which is incorporated by reference.

In particular embodiments, one or more additional feature calculators 310 may calculate additional features and/or process additional features. For example, the calculated similarity scores 322 and/or the calculated social-graph affinities 324 of the incoming content objects 320 of may be used as features in a learning model at component 310. Other features in the learning model may include a collaborative filter, social connection count, a count of users who have joined the event, a count of how many people have been invited to or have viewed the event, and so on. The input features may be used for boosted decision trees or logistic regression to train a model for classification, for example.

In particular embodiments, a filter and rank component 312 may filter out (e.g., discard) incoming content objects 320 having similarity scores 322 that do not satisfy a threshold condition, and may rank the incoming content objects 320 according to their similarity scores 322. For example, if the similarity score 322 is at least a threshold value, e.g., 0.3, 0.5, 0.7. 0.9, or the like, then the first topic vector may be considered sufficiently similar to the existing topic score vector to recommend the candidate event to the user. The filter and rank component 312 may also use output of the additional features and/or learning model of component 310 to filter and rank the incoming content objects 320. The remaining content objects 326 may be ranked and presented to the user 318.

Figure 4:
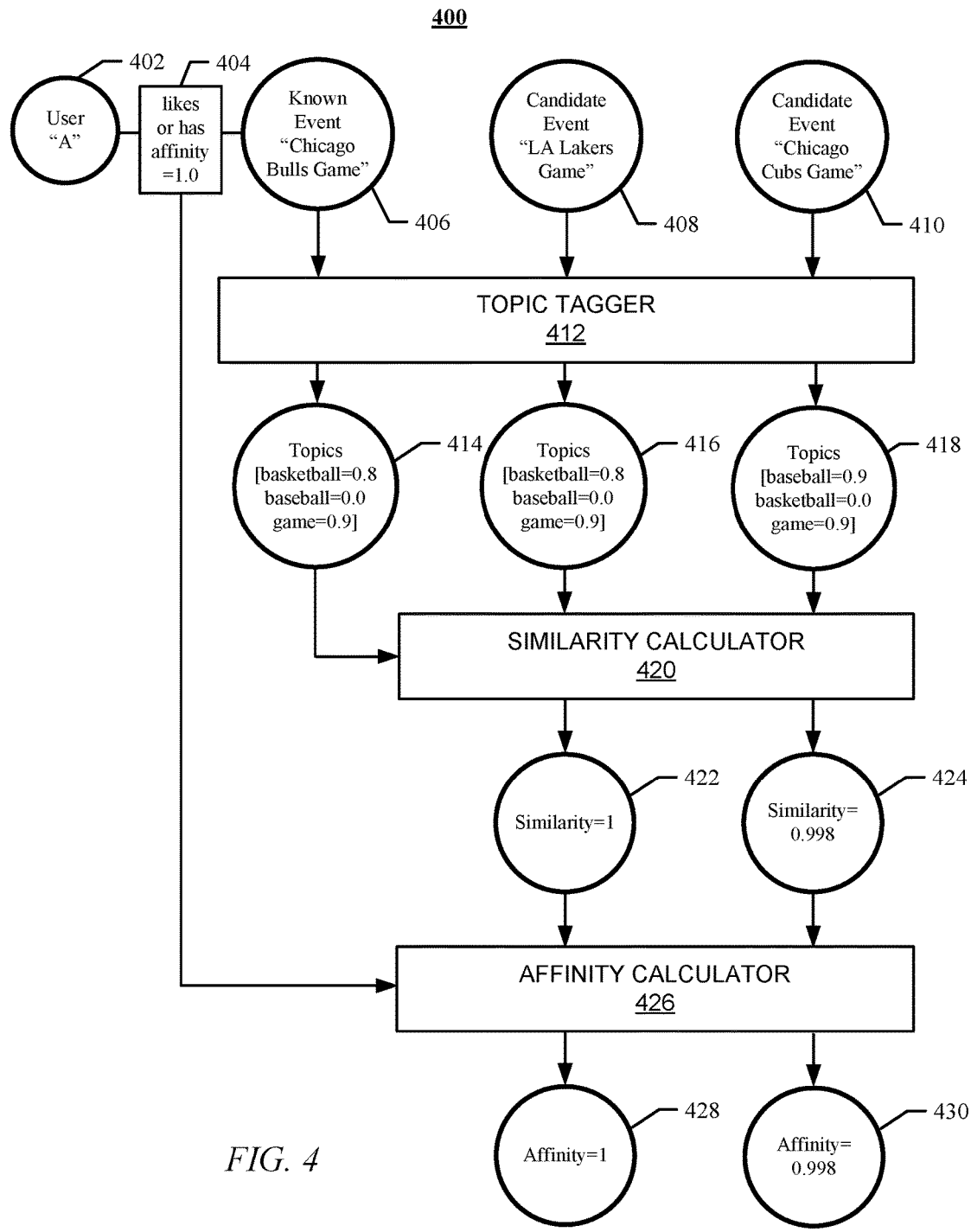
FIG. 4 illustrates example calculations of similarity and affinity between two events.

FIG. 4 illustrates example calculations 400 of similarity and affinity between two events. In this example, a user "A" 402 is associated with an existing content object 406, which is an event named "Chicago Bulls Game." The association is established by a "joined" relationship 404 between user "A" 402 and the event 406. The "joined" relationship 404 has an affinity of 1.0, which indicates a strong level of interest by User "A" 402. Two candidate events "LA Lakers Game" 408 and "Chicago Cubs Game" 410 are received, e.g., by a recommendation engine of the online social-network searching a database of events for events that may be of interest to the user "A" 402. To determine if the candidate events 408, 410 are of interest to the user 402, the events 408, 410 are passed to a topic tagger 412 along with the existing event "Chicago Bulls Game" 406. The topic tagger 412 generates the topic vector 414 [basketball=0.8, baseball=0.0, game=0.9] for the existing event "Chicago Bulls Game" 406. The topic tagger also generates the topic vector 416 [basketball=0.8, baseball=0.0, game=0.9] for the candidate event "LA Lakers Game" 408 and the topic vector 418 [baseball=0.9, basketball=0.0, game=0.9] for the candidate event "Chicago Cubs Game" 410.

A similarity calculator 420 then compares the topic vector 414 for the existing event "Chicago Bulls Game" 406 to the topic vector 416 for the candidate event "LA Lakers Game" 408 to calculate a first similarity score 422 using cosine similarity as the dot product of the vectors divided by the magnitude of the vectors, which produces the resulting similarity score=1. For V1=[0.8 0.0 0.9] and V2=[0.8 0.0 0.9], the vector cosine similarity score may be calculated as follows:

$$\text{similarity score} = \frac{A \cdot B}{\|A\|\|B\|}$$

$$= \frac{1.45}{\sqrt{0.8^2 + 0.0^2 + 0.9^2} \sqrt{0.8^2 + 0.0^2 + 0.9^2}}$$

$$= \frac{1.45}{1.45}$$

$$= 1.0$$

The similarity score 422 of 1.0 indicates that V1 and V2 are very strongly similar (they are equal vectors). Thus, the candidate event "LA Lakers Game" 408 is very strongly similar to the existing event "Chicago Bulls Game" 406.

The similarity calculator 420 also compares the topic vector 414 for the existing event "Chicago Bulls Game" 406 to the topic vector 418 for the candidate event "Chicago Cubs Game" 410 to calculate a second similarity score 424, which produces the resulting similarity score=0.998. For V1=[0.8 0.0 0.9] and V2=[0.9 0.0 0.9], the vector cosine similarity score may be calculated as follows:

$$\text{similarity score} = \frac{A \cdot B}{\|A\|\|B\|}$$

$$= \frac{1.53}{\sqrt{0.8^2 + 0.0^2 + 0.9^2} \sqrt{0.9^2 + 0.0^2 + 0.9^2}}$$

$$= \frac{1.53}{1.53264}$$

$$= 0.998$$

The similarity score 424 of 0.998 indicates that V1 and V2 are strongly similar (they are nearly equal vectors). Thus, the candidate event "Chicago Cubs Game" 410 is strongly similar to the existing event "Chicago Bulls Game" 406.

An affinity calculator 426 may optionally calculate the social-graph affinities 428, 430 based on the respective similarity scores 422, 424 by multiplying the similarity scores 422, 424 by the affinity 404 for the existing event 406. Since the affinity 404 is 1.0, the social-graph affinities 428, 430 are equal to the similarity scores. That is, since the user "A" 402 likes the existing event "Chicago Bulls Game" very strongly, the affinities of the candidate events are not reduced when they are multiplied by the user's high affinity (1.0) for the existing event.

Figure 5:
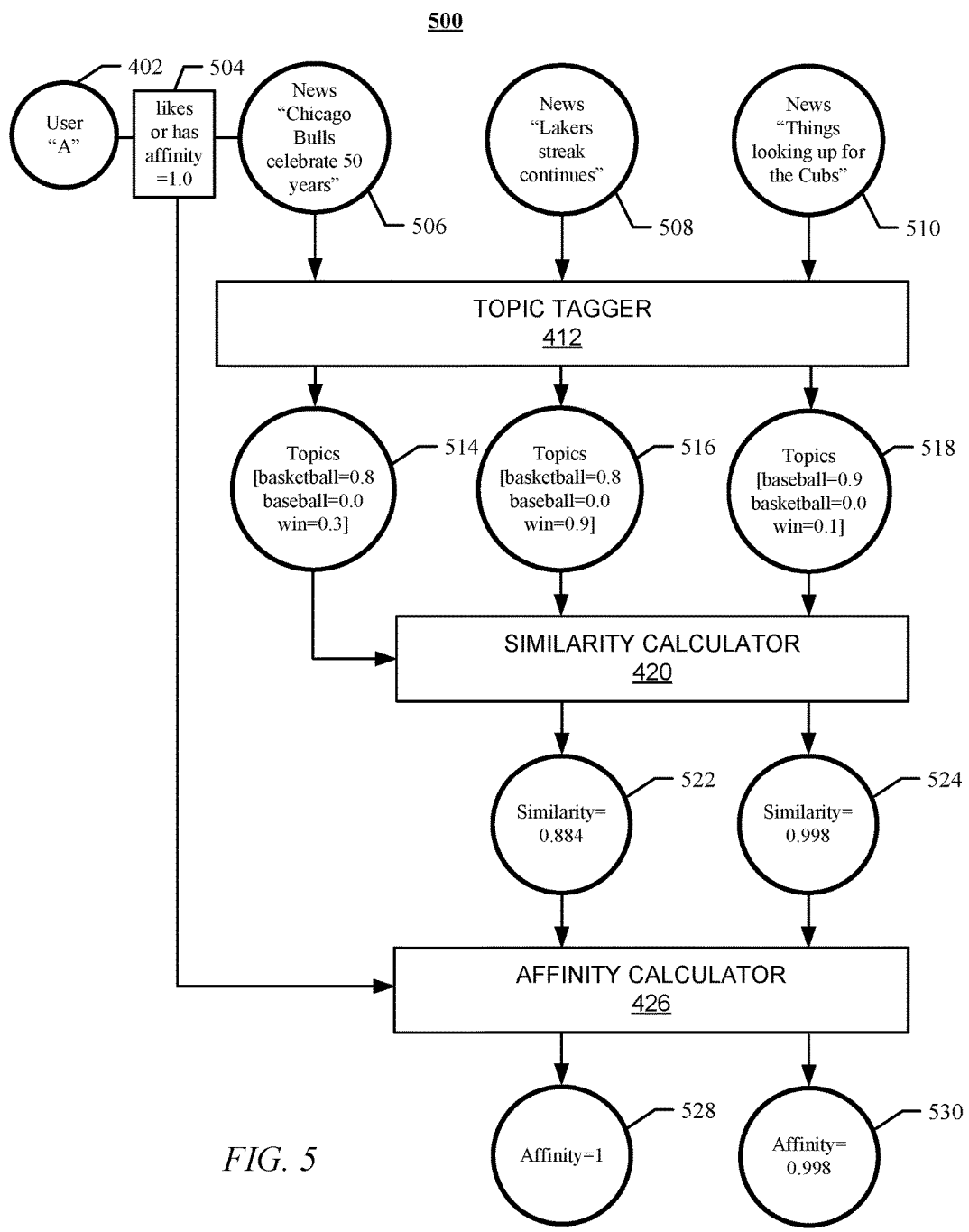
FIG. 5 illustrates example calculations of similarity and affinity between two news items.

FIG. 5 illustrates example calculations 500 of similarity and affinity between two news items. In this example, a user "A" 402 is associated with an existing content object 406, which is a news story with the content "Chicago Bulls celebrate 50 years." The association is established by a "likes" relationship 504 between user "A" 402 and the news story 506. The "likes" relationship 504 has an affinity of 1.0, which indicates a strong level of interest by User "A" 402. Two candidate news stories, "Lakers streak continues" 508 and "Things looking up for the Cubs" 510, are received, e.g., by a news feed or by a recommendation engine of the online social-network searching a database of new stories for stories that may be of interest to the user "A" 402. To determine if the candidate stories 508, 510 are of interest to the user 402, the stories 508, 510 are passed to a topic tagger 412 along with the existing story "Chicago Bulls celebrate 50 years" 506. The topic tagger 412 generates the topic vector 514 [basketball=0.8, baseball=0.0, win=0.3] for the existing news story "Chicago Bulls celebrate 50 years" 506. The topic tagger also generates the topic vector 516 [basketball=0.8, baseball=0.0, win=0.9] for the candidate news story "Lakers streak continues" 508 and the topic vector 518 [baseball=0.9, basketball=0.0, win=0.1] for the candidate news story "Things looking up for the Cubs" 510.

A similarity calculator 420 then compares the topic vector 514 for the existing news story "Chicago Bulls celebrate 50 years" 506 to the topic vector 516 for the candidate news story "Lakers streak continues" 508 to calculate a first similarity score 522 using cosine similarity as the dot product of the vectors divided by the magnitude of the vectors, which produces the resulting similarity score=0.884. For V1=[0.8 0.0 0.3] and V2=[0.8 0.0 0.9], the vector cosine similarity score may be calculated as follows:

$$\text{similarity score} = \frac{A \cdot B}{\|A\|\|B\|}$$

$$= \frac{0.91}{\sqrt{0.8^2 + 0.0^2 + 0.3^2}\sqrt{0.8^2 + 0.0^2 + 0.9^2}}$$

$$= \frac{0.91}{1.02883429}$$

$$= 0.884$$

The similarity score 422 of 0.884 indicates that V1 and V2 are strongly similar (they are similar vectors). Thus, the candidate news story "Lakers streak continues" 408 is strongly similar to the existing news story "Chicago Bulls celebrate 50 years" 506.

The similarity calculator 420 also compares the topic vector 514 for the existing news story "Chicago Bulls celebrate 50 years" 506 to the topic vector 518 for the candidate news story "Things looking up for the Cubs" 510 to calculate a second similarity score 524, which produces the resulting similarity score=0.969. For V1=[0.8 0.0 0.3] and V2=[0.9 0.0 0.1], the vector cosine similarity score may be calculated as follows:

$$\text{similarity score} = \frac{A \cdot B}{\|A\|\|B\|}$$

$$= \frac{0.75}{\sqrt{0.8^2 + 0.0^2 + 0.3^2}\sqrt{0.9^2 + 0.0^2 + 0.1^2}}$$

$$= \frac{0.75}{0.773692}$$

$$= 0.969$$

The similarity score 524 of 0.969 indicates that V1 and V2 are strongly similar (they are nearly equal vectors). Thus, the candidate news story "Things looking up for the Cubs" 510 is strongly similar to the existing news story "Chicago Bulls celebrate 50 years" 506.

An affinity calculator 426 may optionally calculate the social-graph affinities 528, 530 based on the respective similarity scores 522, 524 by multiplying the similarity scores 522, 524 by the affinity 504 for the existing news story 506. Since the affinity 504 is 1.0, the social-graph affinities 528, 530 are equal to the similarity scores. That is, since the user "A" 402 likes the news story "Chicago Bulls celebrate 50 years" very strongly, the affinities of the candidate news stories are not reduced when they are multiplied by the user's high affinity (1.0) for the existing news story.

Figure 6:
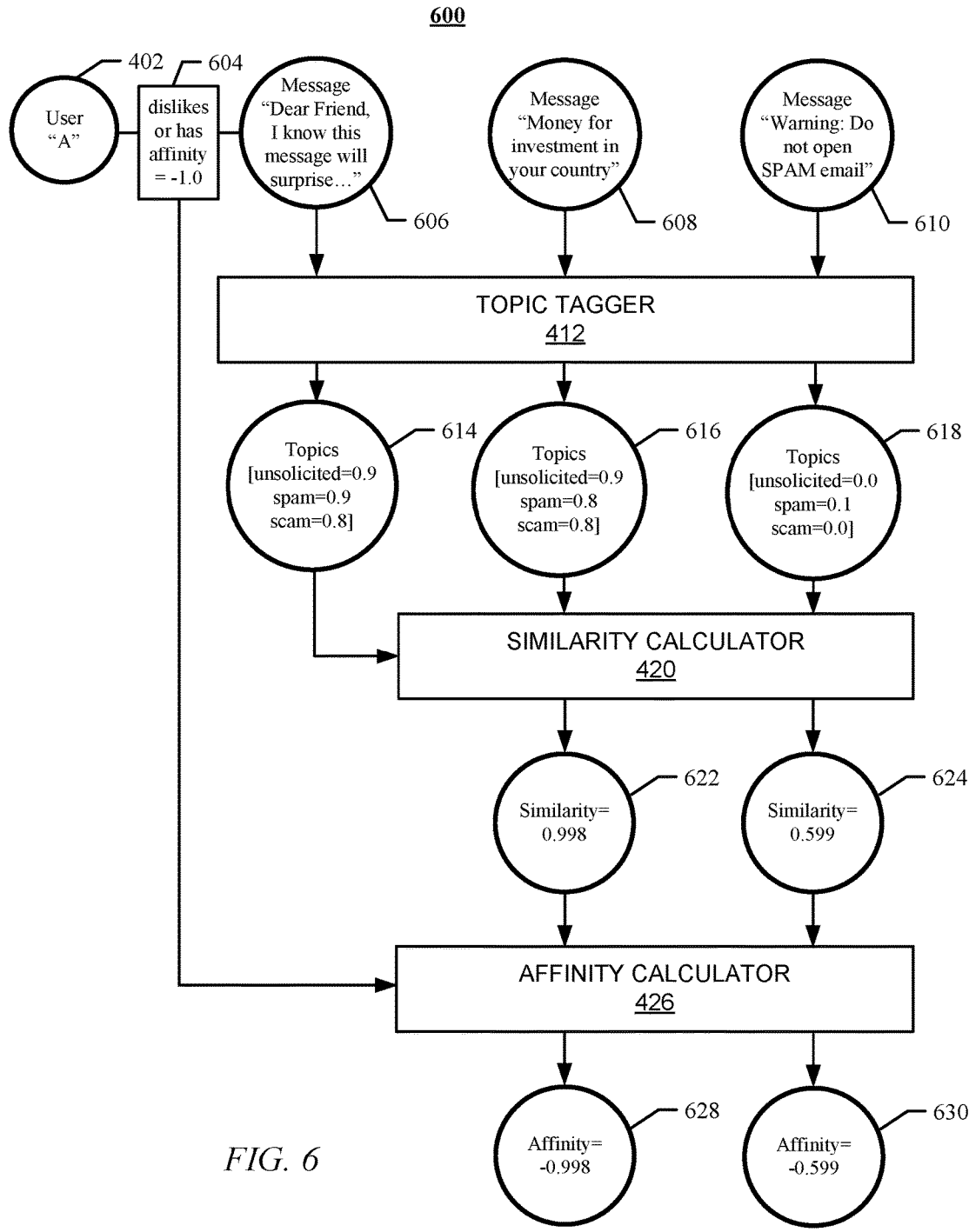
FIG. 6 illustrates example calculations of similarity and affinity between two email messages with affinity for the second event determined based on a user's negative affinity for the first event.

FIG. 6 illustrates example calculations 600 of similarity and affinity between two email messages with affinity for the second email determined based on a user's negative affinity for the first email. In this example, a user "A" 402 is associated with an existing content object 606, which is an email message with the content "Dear Friend, I know this message will surprise . . . " The association is established by a "Marked as spam" relationship 604 between user "A" 402 and the email 606. The "Marked as spam" relationship 604 has an affinity of −1.0, which indicates a strong level of disinterest by User "A" 402. Two candidate email, "Money for investment in your country" 608 and "Warning: Do not open spam email" 610, are received, e.g., by an email application checking a mail server for mail addressed to user "A" 402. To determine if the candidate emails 608, 610 are of interest to the user 402, the emails 608, 610 are passed to a topic tagger 412 along with the existing email "Dear Friend . . . " 606. The topic tagger 412 generates the topic vector 614 [unsolicited=0.9, spam=0.9, scam=0.8] for the existing email "Dear Friend . . . " 606. The topic tagger also generates the topic vector 616 [unsolicited=0.9, spam=0.8, scam=0.8] for the candidate email "Money for investment in your country" 608 and the topic vector 618 [unsolicited=0.0, spam=0.1, scam=0.0] for the candidate email "Warning: Do not open spam email" 610 (which is an email received from a friend of the user "A" 402).

A similarity calculator 420 then compares the topic vector 614 for the existing email "Dear Friend . . . " 606 to the topic vector 616 for the candidate email "Money for investment in your country" 608 to calculate a first similarity score 622 using cosine similarity as the dot product of the vectors divided by the magnitude of the vectors, which produces the resulting similarity score=0.998. The similarity score 622 of 0.998 indicates that V1 and V2 are strongly similar (they are similar vectors). Thus, the candidate email "Money for investment in your country" 608 is strongly similar to the existing email "Dear Friend . . . " 606.

The similarity calculator 420 also compares the topic vector 614 for the existing news story "Dear Friend . . . " 606 to the topic vector 618 for the candidate email "Warning: Do not open spam email" 610 to calculate a second similarity score 624, which produces the resulting similarity score=0.599. The similarity score 624 of 0.599 indicates that V1 and V2 are not similar (they are substantially different vectors). Thus, the candidate email "Warning: Do no open spam email" 610 is not similar to the existing email "Dear Friend . . . " 606.

An affinity calculator 426 may optionally calculate the social-graph affinities 628, 630 based on the respective similarity scores 622, 624 by multiplying the similarity scores 622, 624 by the affinity 604 for the existing email 606. Since the affinity 604 is −1.0, the social-graph affinities 628, 630 are equal to the negative of the similarity scores. That is, since the user "A" 402 dislikes the email "Dear Friend" very strongly, the affinities of the candidate emails become strongly negative when they are multiplied by the user's negative affinity (−1.0) for the existing email.

Figure 7:
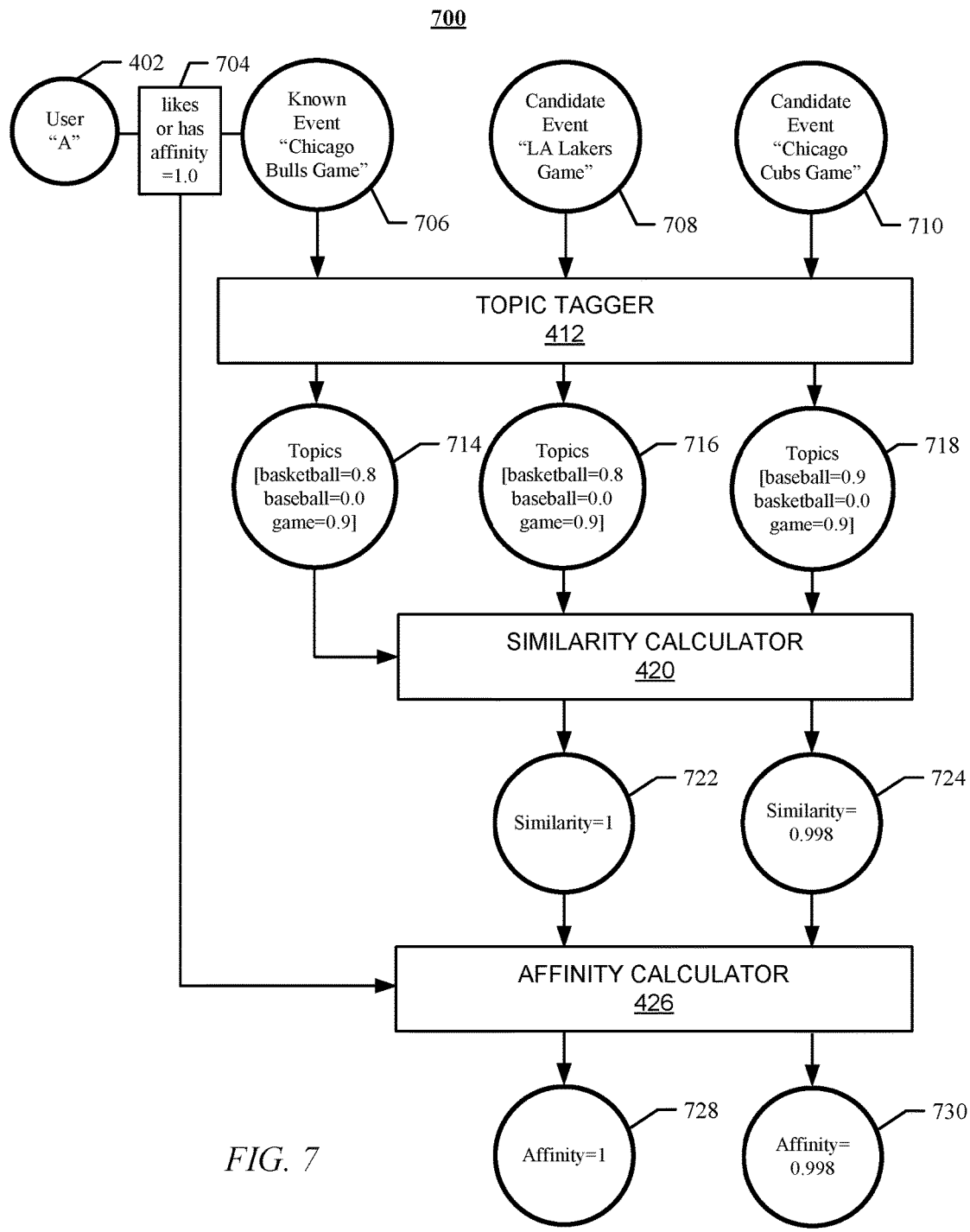
FIG. 7 illustrates example calculations of similarity and affinity between two events with affinity for the second event determined based on a user's fractional affinity for the first event.

FIG. 7 illustrates example calculations 700 of similarity and affinity between two events with affinity for the second event determined based on a user's fractional affinity for the first event. The example calculations of FIG. 7 are similar to those shown in FIG. 4, except the social-graph affinity 704 of the user "A" 402 for the existing event "Chicago Bulls Game" 706 is 0.5 instead of 1.0. The affinity 704 of 0.5 indicates that the user "A" 402 now has a medium level of interest in the existing event "Chicago Bulls Game" 706. The affinity calculator 426 calculates the social-graph affinities 728, 730 based on the respective similarity scores 722, 724 by multiplying the similarity scores 722, 724 by the affinity 704 for the existing event 706. Since the affinity 704 is 0.5, the social-graph affinities 728, 730 are equal to the similarity scores 722, 724 multiplied by 0.5. The resulting affinities 728, 730 are 1*0.5=0.5 and 0.998*0.5=0.499, respectively. That is, since the user "A" 402 has a medium level of interest for the existing event "Chicago Bulls Game", the affinities of the candidate events are reduced proportionally to that medium level of interest when they are multiplied by the user's medium affinity (0.5) for the existing event. These reduced affinities may result in the candidate events 708, 710 being filtered out and not presented to the user as recommendations (e.g., if the threshold value for recommendations is greater than 0.5), and/or being ranked lower in search results than they would be in the example of FIG. 4, where the user's affinity of 1.0 for the existing event does not reduce the ranking of the candidate events.

Figure 8:
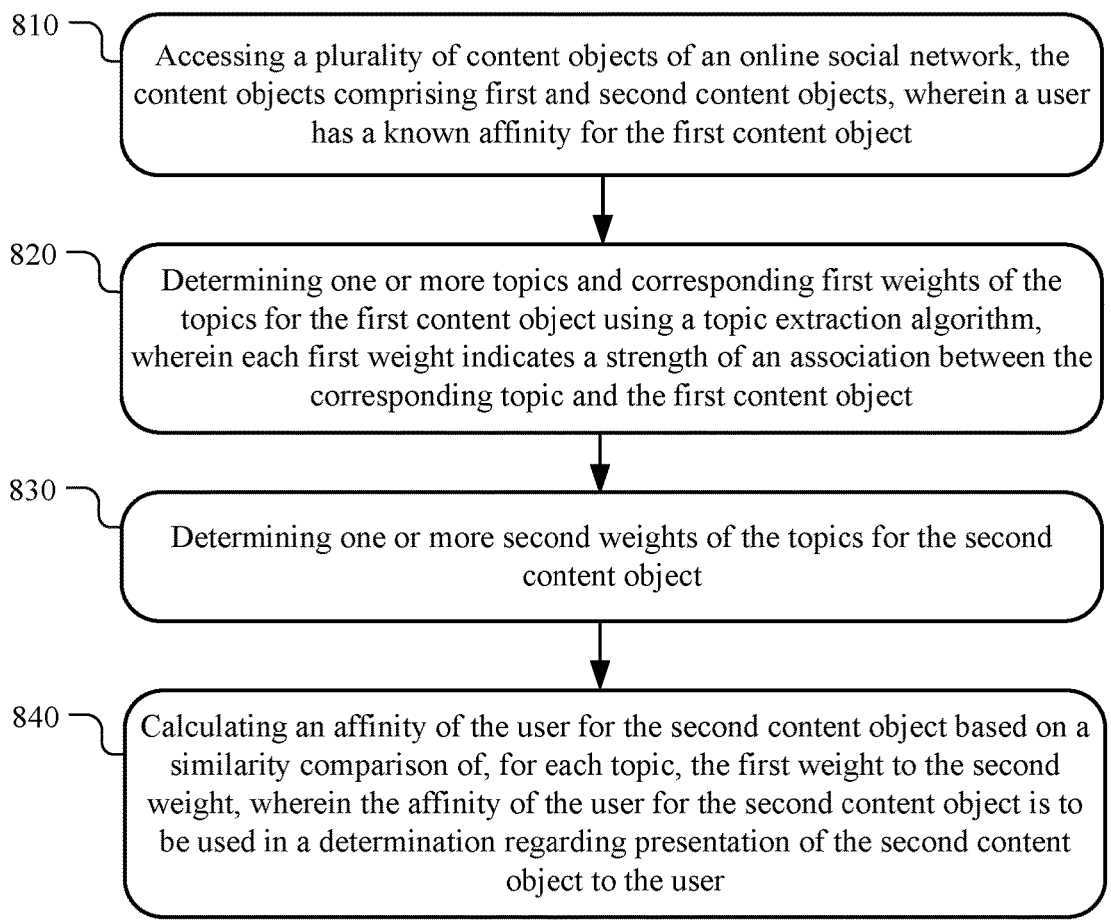
FIG. 8 illustrates an example method for calculating a similarity score to be used in a determination regarding presentation of a content object to a user.

FIG. 8 illustrates an example method 800 for calculating a similarity score to be used in a determination regarding presentation of a content object to a user. The method may begin at step 810, where the social-networking system 160 may access a plurality of content objects of an online social network, the content objects comprising one or more first content objects associated with a user in the online social network and a second content object. At step 820, the social-networking system 160 may determine one or more topics and corresponding first weights of the topics for the one or more first content objects using a topic extraction algorithm, wherein each first weight indicates a strength of an association between the corresponding topic and one or more of the first content objects. At step 830, the social-networking system 160 may determine one or more second weights of the topics for the second content object, wherein each second weight indicates a strength of an association between the corresponding topic and the second content object. At step 840, the social-networking system 160 may calculate a similarity score for the second content object based on a comparison of, for each topic, the first weight to the second weight, wherein the similarity score is to be used in a determination regarding presentation of the second content object to the user. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for calculating a similarity score including the particular steps of the method of FIG. 8, this disclosure contemplates any suitable method for calculating a similarity score including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
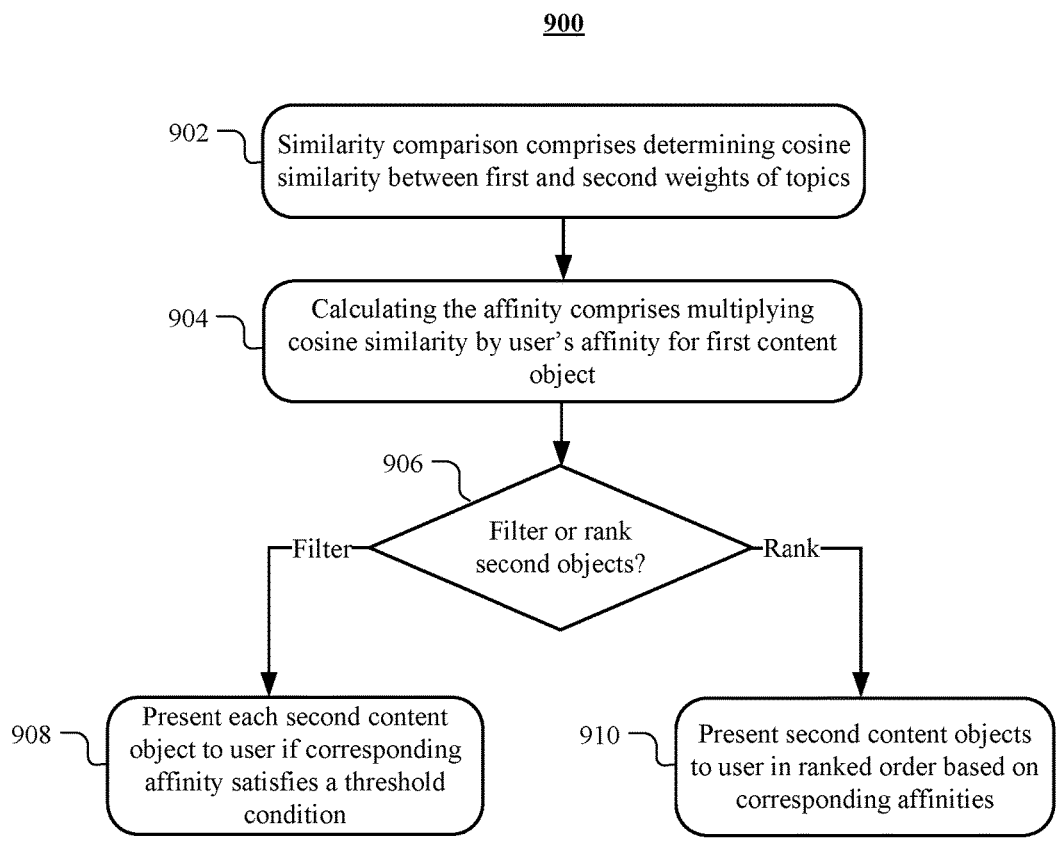
FIG. 9 illustrates an example method for calculating a similarity score and an affinity for presenting content objects to a user.

FIG. 9 illustrates an example method 900 for calculating a similarity score and an affinity for presenting content objects to a user. The method 900 may be invoked by, for example, the method of FIG. 8 to calculate the similarity score and the social-graph affinity of the user for the second content object. The method may begin at step 910, where the social-networking system 160 may calculating the similarity score for the second content object by calculating a cosine similarity between the one or more first weights and the one or more second weights. At step 920, the social-networking system 160 may calculate the social-graph affinity of the user for the second content object by multiplying the similarity score for the second content object by one or more of the affinities of the user for the one or more first content objects. At step 930, the social-networking system 160 may determine, based on the type of content objects be processed, or based on user interface options, whether to filter or rank the second content objects. For example, events may be filtered, and events that meet a threshold similarity or affinity value may be recommended to the user, and news stories may be ranked and displayed in ranked order. Alternatively, the social-networking system 160 may determine to both filter and rank the second objects, in which case both steps 940 and 950 may be executed. If step 930 determines that the second content objects are to be filtered, then at step 940, the social-networking system 160 may present each second content object to the user if the affinity correspond to the second content object satisfies a threshold condition. If step 930 determines that the second content objects are to be ranked, then at step 950, the social-networking system 160 may present the second content objects to the user in ranked order based on the affinities corresponding to the second content objects. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for calculating a similarity score and an affinity including the particular steps of the method of FIG. 9, this disclosure contemplates any suitable method for calculating a similarity score and an affinity including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

In particular embodiments, the social-networking system 160 may access a plurality of content objects of an online social network, the content objects comprising one or more first content objects associated with a user in the online social network and a second content object. The first and second content objects may be news stories, social-network events, messages, social-network posts or comments, or the like. The first content objects are ordinarily of the same type (e.g., events, news stories, messages, or other type of content) as each other and as the second content object. Alternatively, the content objects may be of different types, e.g., any type of content object from which content such as text can be extracted. The association between the existing content objects 314 and a user 318 may be established by existence of an edge between a user node that represents the user 318 and a node that represents or is associated with the existing content object 314. The edge may represent a relationship such as likes, or a "joined" relationship that indicates the user has joined an event (for a content object 314 that represents an event). The edge may represent any other suitable relationship between the user 318 and the existing content object 314, e.g., a "dislike" relationship indicating that the user 318 dislikes the content object 314, a "viewed" relationship indicating that the user 318 has viewed the content object 314, and the like.

In particular embodiments, the second content object may be understood as a "candidate object" that is to be evaluated, e.g., for possible presentation or recommendation to a user. The second content object may be identified and/or received, e.g., by a recommendation engine of the online social-network searching a database of content objects such as events or news stories that may be of interest to the user. As another example, the second content object may be an email message received by an email application checking a mail server for mail addressed to user. Although this disclosure describes accessing content objects in a particular manner, this disclosure contemplates accessing content objects in any suitable manner.

In particular embodiments, the social-networking system 160 may determine one or more topics and corresponding first weights of the topics for the one or more first content objects using a topic extraction algorithm, wherein each first weight indicates a strength of an association between the corresponding topic and one or more of the first content objects. In particular embodiments, the social-networking system 160 may determine one or more second weights of the topics for the second content object, wherein each second weight indicates a strength of an association between the corresponding topic and the second content object. The topics and associated weights may be determined using a topic tagger 302, e.g., an LDA-based topic tagger as described with reference to FIG. 3. Although this disclosure describes determining topics and corresponding weights in a particular manner, this disclosure contemplates determining topics and corresponding weights in any suitable manner.

In particular embodiments, the social-networking system 160 may calculate a similarity score for the second content object based on a comparison of, for each topic, the first weight to the second weight, wherein the similarity score is to be used in a determination regarding presentation of the second content object to the user. The similarity score may be calculated using a similarity calculator 304 as described with reference to FIG. 3. In particular embodiments, the social-networking system 160 may calculate the similarity score for the second content object by calculating a cosine similarity between the one or more first weights and the one or more second weights. Although this disclosure describes calculating a similarity score in a particular manner, this disclosure contemplates calculating a similarity score in any suitable manner.

In particular embodiments, the social-networking system 160 may determine, based on the similarity score for the second content object, whether to present the second content object to the user. As an example and not by way of limitation, the social-networking system 160 may determine whether to present the second content object to the user by determining whether the similarity score satisfies a threshold condition. In particular embodiments, the social-networking system 160 may, in response to determining that the second content object is to be presented to the user, send, to a client device of the user for display, a results page comprising a reference to the second content object.

In particular embodiments, the first content objects may include one or more first events and the second content object may include a second event in the online social network. The social-networking system 160 may determine, based on the similarity score for the second content object, whether to recommend the second event to the user. As an example and not by way of limitation, the user may have joined or liked at least one of the first events, thereby causing the least one of the first events to be associated with the user. An association between the at least one of the first events and the user may alternatively be established when at least one friend of the user has joined or liked at least one of the first events. In particular embodiments, the first events may comprise some or all of the events the user has joined. In particular embodiments, the social-networking system 160 may, in response to determining to recommend the second event to the user, send, to a client device of the user for display, a recommendation for the second event. The related events may be used as recommendations to assist users in discovering events of interest. For example, given an event that a user is known to like, other events related to the known event may be identified and recommended to the user. Events related to a given event may be found by identifying topics in the given event, then comparing the identified topics to topics in a candidate event. If the comparison indicates that the topics are sufficiently similar, then the candidate event is similar to the given event and may be recommended to users who are interested in the given event.

In particular embodiments, the first content objects may include one or more first news objects and the second content object may include a second news object. The social-networking system 160 may determine, based on the similarity score for the second content object, whether to include the second news object in a newsfeed associated with the user in the online social network. As an example and not by way of limitation, the user may have liked one or more of the first news objects, thereby establishing an association between the user and the first news objects. In particular embodiments, the first content objects may include one or more first news objects, and the second content object may include a second news object.

In particular embodiments, the social-networking system 160 may determine a ranking of a plurality news objects for a newsfeed, the plurality of news objects including the second news object, wherein the ranking is according to a plurality of similarity scores associated with the plurality of news objects. The social-networking system 160 may present one or more of the plurality of news objects to the user in the newsfeed in an order based on the ranking.

In particular embodiments, the user may be associated with the one or more first content objects by one or more corresponding social-graph affinities. The social-networking system 160 may calculate a social-graph affinity of the user for the second content object based on the similarity score and the one or more social-graph affinities of the user for the one or more first content objects. The social-networking system 160 may determine, based on the social-graph affinity of the user for the second content object, whether to present the second content object to the user. To calculate the social-graph affinity of the user for the second content object, the social-networking system 160 may multiply the similarity score for the second content object by one or more of the affinities of the user for the one or more first content objects.

In particular embodiments, to calculate an affinity of the user for the second content object, the social-networking system 160 may determine whether the user has a negative affinity for the one or more first content objects, and, in response to determining that the user has a negative affinity for the one or more first content objects, associate an indication of negative affinity with the affinity of the user for the second content object.

In particular embodiments, the social-networking system 160 may determine whether to present the second content object to the user by determining whether the affinity of the user for the second content object satisfies a threshold condition. In particular embodiments, the one or more first content objects may include one or more first unwanted communications, such as a spam message addressed to the user. The social-networking system 160 may determine, based on the social-graph affinity of the user for the second content object, whether the second content object includes a second unwanted communication. In particular embodiments, the social-networking system 160 may provide the social-graph affinity of the user for the second content object to a machine-learning system as a signal associated with the second content object.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by a history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170

(e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 10:
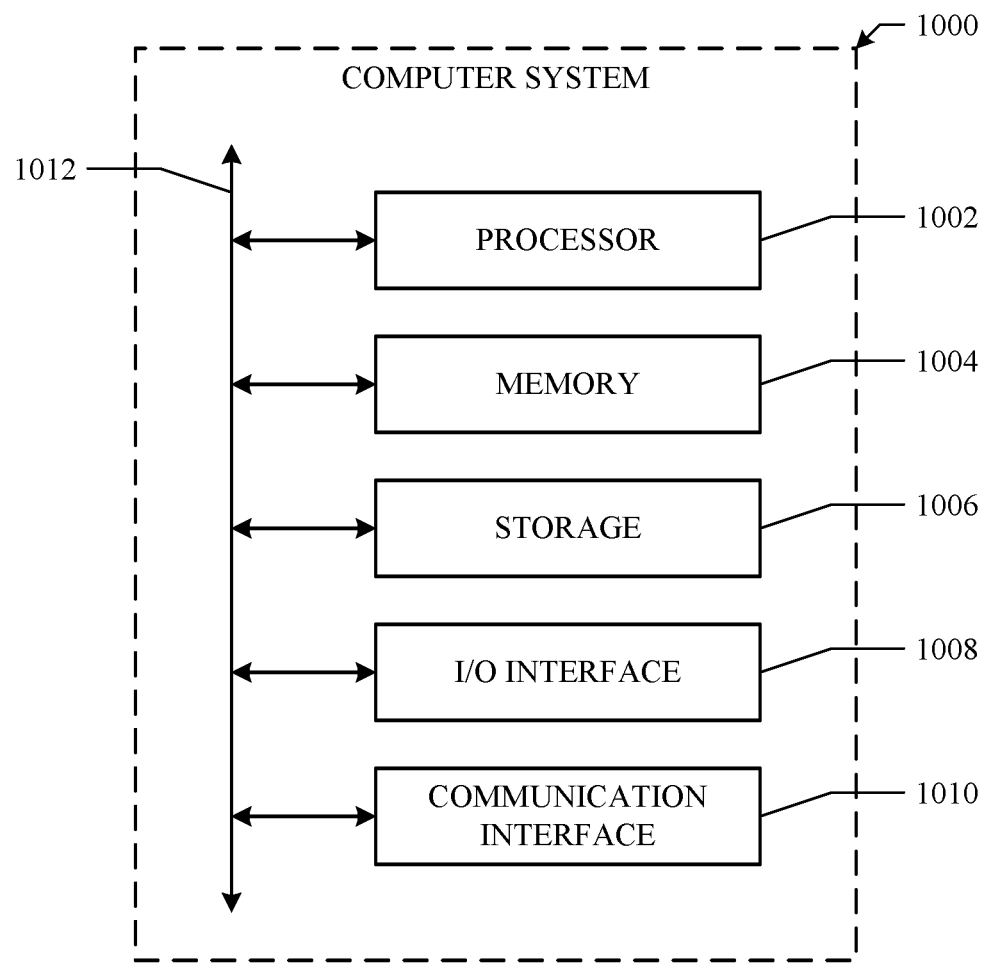
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:

accessing a plurality of content objects of an online social network, the content objects comprising one or more first content objects associated with a user in the online social network and a second content object;

determining one or more topics and corresponding first weights of the topics for the one or more first content objects using a topic extraction algorithm, wherein each first weight indicates a strength of an association between the corresponding topic and one or more of the first content objects;

determining one or more second weights of the topics for the second content object, wherein each second weight indicates a strength of an association between the corresponding topic and the second content object;

calculating a similarity score for the second content object based on a comparison of, for each topic, the first weight to the second weight, wherein the user is associated with the one or more first content objects by one or more corresponding social-graph affinities, wherein each of the social-graph affinities represents a level of interest between the user and a corresponding one of the first content objects, at least one of the social-graph affinities indicating a level of interest between a strong positive affinity and a strong negative affinity;

calculating an affinity of the user for the second content object based on the similarity score and the one or more social-graph affinities of the user for the one or more first content objects;

determining, based on the affinity of the user for the second content object, whether to present the second content object to the user; and in response to determining that the second content object is to be presented to the user, sending, to a client device of the user for display, a results page comprising a reference to the second content object.

2. The method of claim 1, wherein calculating the similarity score for the second content object comprises calculating a cosine similarity between the one or more first weights and the one or more second weights.

3. The method of claim 1, wherein determining whether to present the second content object to the user comprises determining whether the similarity score satisfies a threshold conditions.

4. The method of claim 1, wherein the first content objects comprise one or more first events and the second content object comprises a second event in the online social network.

5. The method of claim 4, wherein the user has joined or liked at least one of the first events.

6. The method of claim 4, wherein the results page comprises a recommendation for the second event.

7. The method of claim 1, wherein the first content objects comprise one or more first news objects and the second content object comprises a second news object, the method further comprising:

determining, based on the similarity score for the second content object, whether to include the second news object in a newsfeed associated with the user in the online social network.

8. The method of claim 7, wherein the user has liked one or more of the first news objects.

9. The method of claim 1, wherein the first content objects comprise one or more first news objects and the second content object comprises a second news object, the method further comprising:

determining a ranking of a plurality news objects for a newsfeed, the plurality of news objects including the second news object, wherein the ranking is according to a plurality of similarity scores associated with the plurality of news objects; and presenting one or more of the plurality of news objects to the user in the newsfeed in an order based on the ranking.

10. The method of claim 1, wherein calculating the affinity of the user for the second content object comprises multiplying the similarity score for the second content object by one or more of the social-graph affinities of the user for the one or more first content objects.

11. The method of claim 1, wherein calculating the affinity of the user for the second content object comprises:

determining whether the user has a negative affinity for the one or more first content objects; and in response to determining that the user has a negative affinity for the one or more first content objects, associating an indication of negative affinity with the affinity of the user for the second content object.

12. The method of claim 1, Wherein the one or more first content objects comprise one or more first unwanted communications, the method further comprising:

determining, based on the affinity of the user for the second content object, whether the second content object, comprises a second unwanted communication.

13. The method of claim 1, comprising providing the affinity of the user for the second content object to a machine-learning system as a signal associated with the second content object.

14. One or more computer-readable non-transitory storage media embodying software that is operable when executed to:

access a plurality of content objects of an online social network, the content objects comprising one or more first content objects associated with a user in the online social network and a second content object;

determine one or more topics and corresponding first weights of the topics for the one or more first content objects using a topic extraction algorithm, wherein each first weight indicates a strength of an association between the corresponding topic and one or more of the first content objects;

determine one or more second weights of the topics for the second content object, wherein each second weight indicates a strength of an association between the corresponding topic and the second content object;

calculate a similarity score for the second content object based on a comparison of, for each topic, the first weight to the second weight, wherein the user is associated with the one or more first content objects by one or more corresponding social-graph affinities, wherein each of the social-graph affinities represents a level of interest between the user and a corresponding one of the first content objects, at least one of the social-graph affinities indicating a level of interest between a strong positive affinity and a strong negative affinity;

calculate an affinity of the user fin the second content object based on the similarity score and the one or more social-graph affinities of the user for the one or more first content objects;

determine, based on the affinity of the user for the second content object, whether to present the second content object to the user; and in response to determining that the second content object is to be presented to the user, sending, to a client device of the user for display, a results page comprising a reference to the second content object.

15. A system comprising: one or more processors; and a non-transitory memory coupled to the processors comprising instructions executable by the processors, the processors operable when executing the instructions to:

access a plurality of content objects of an online social network, the content objects comprising one or more first content objects associated with a user in the online social network and a second content object;

determine one or more topics and corresponding first weights of the topics for the one or more first content objects using a topic extraction algorithm, wherein each first weight indicates a strength of an association between the corresponding topic and one or more of the first content objects;

determine one or more second weights of the topics for the second content object, wherein each second weight indicates a strength of an association between the corresponding topic and the second content object;

calculate a similarity score for the second content object based on a comparison of, for each topic, the first weight to the second weight, wherein the user is associated with the one or more first content objects by one or more corresponding social-graph affinities, wherein each of the social-graph affinities represents a level of interest between the user and a corresponding one of the first content objects, at least one of the social-graph affinities indicating a level of interest between a strong positive affinity and a strong negative affinity;

calculate an affinity of the user for the second content object based on the similarity score and the one or more social-graph affinities of the user for the one or more first content objects;

determine, based on the affinity of the user for the second content object, whether to present the second content object to the user; and in response to determining that the second content object is to be presented to the user, sending, to a client device of the user for display, a results page comprising a reference to the second content object.

* * * * *